United States Patent [19]
Sidelko

[11] Patent Number: 5,261,786
[45] Date of Patent: Nov. 16, 1993

[54] ACTUATOR MECHANISM FOR PUMP SEALING APPARATUS

[75] Inventor: John E. Sidelko, Littleton, Colo.

[73] Assignee: A. R. Wilfley & Sons, Inc., Denver, Colo.

[21] Appl. No.: 664,678

[22] Filed: Mar. 5, 1991

[51] Int. Cl.$^5$ ............................................. F16J 15/16
[52] U.S. Cl. .............................. 415/171.1; 415/173.3
[58] Field of Search ............... 415/171.1, 173.3, 174.2; 277/25, 41

[56] References Cited

U.S. PATENT DOCUMENTS

| | | | |
|---|---|---|---|
| 1,976,532 | 10/1934 | Wilfley | 286/11 |
| 2,581,504 | 1/1952 | Wilfley et al. | 103/111 |
| 2,660,487 | 11/1953 | Wilfley | 363/36.4 |
| 3,137,237 | 6/1964 | Zagar et al. | 103/87 |
| 3,402,671 | 9/1968 | Wilfley et al. | 415/171.1 |
| 3,652,180 | 3/1972 | Choquette et al. | 415/113 |
| 4,915,579 | 4/1990 | Whittier et al. | 415/171.1 |

Primary Examiner—John T. Kwon
Attorney, Agent, or Firm—John E. Reilly

[57] ABSTRACT

A centrifugal pump of the hydraulic sealing type has a novel and improved sealing apparatus for establishing a hydraulic seal and limiting the flow of liquid from a pump casing into a reservoir or seal housing at one end of the pump casing, and a valve assembly in the seal, housing has a valve member normally urged into engagement with the seal housing to isolate liquid in the seal housing from the casing by washer-like spring elements. When the pump is activated and brought up to speed, centrifugal force-responsive pivot members will impart sufficient opening pressure to overcome the resistance of the spring members when the pump approaches operating speed to move the valve member away from sealed engagement with the seal housing; and when the speed is reduced below the operating speed level the spring elements will rapidly undergo deflection to cause the valve member to return to a closed position.

10 Claims, 2 Drawing Sheets

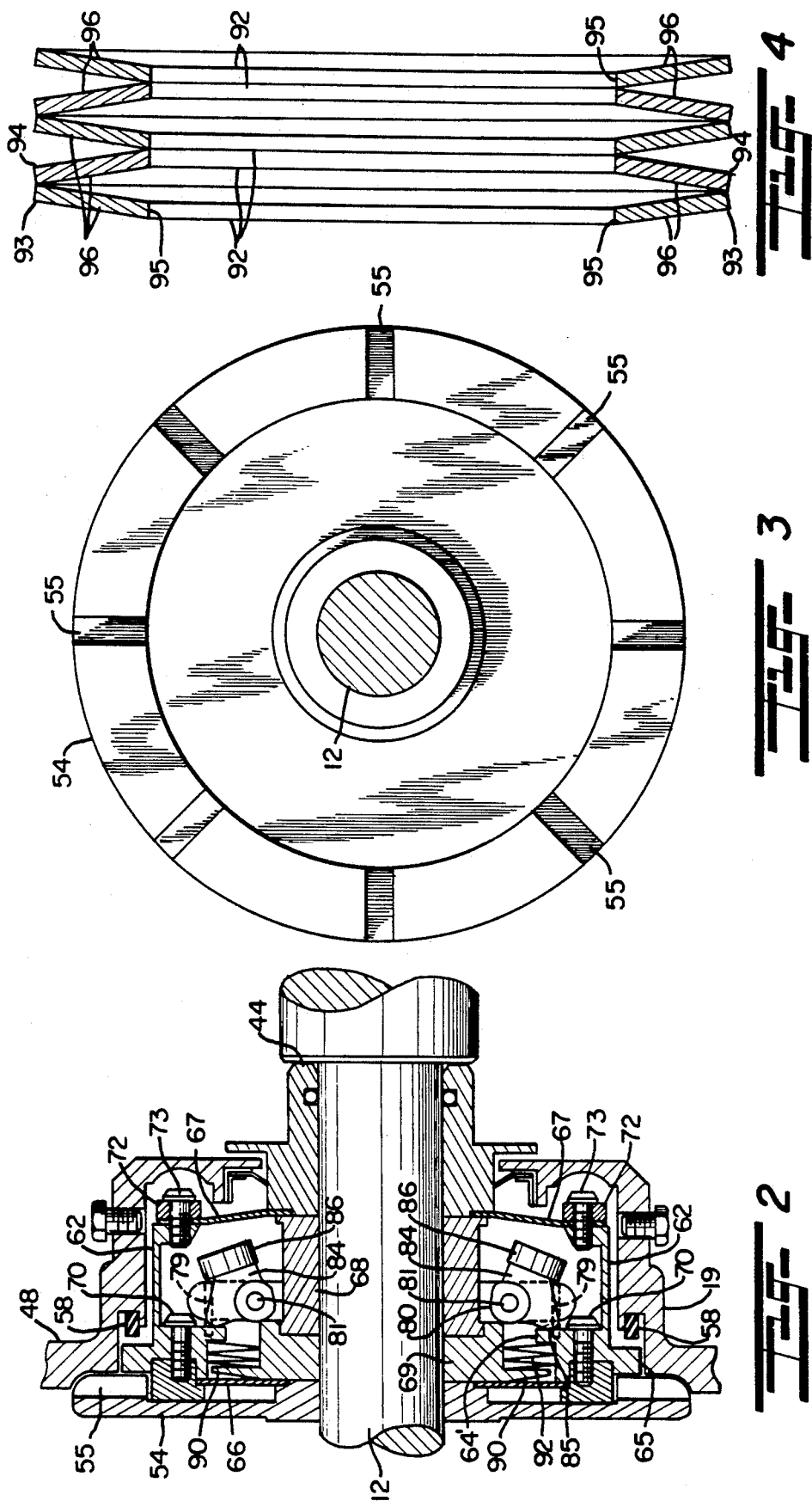

ACTUATOR MECHANISM FOR PUMP SEALING APPARATUS

This invention relates to pumps, and more particularly relates to a novel and improved actuator mechanism for centrifugal pumps and is an improvement to centrifugal pumps of the type set forth and described in U.S. Pat. No. 4,915,579 for Pump Sealing Apparatus to Whittier, et al., and owned by A. R. Wilfley & Sons, Inc., the assignee in this invention.

BACKGROUND AND FIELD OF INVENTION

U.S. Pat. Nos. 1,976,532 and 2,660,487 to A. R. Wilfley & Sons, Inc., the assignee of this invention, are directed to pumps including a check valve assembly around the drive shaft which will open and close an annular gap between the shaft and pump housing in order to maintain the gap open while the pump is running and keep it closed when the pump is at rest. When the pump is running, one or more expellers draws fluid through the gap to generate a counteracting hydraulic pressure or seal to prevent leakage of the working liquid or slurry past the expeller and through the gap when the pump is in operation. The check valve assembly has a speed-responsive actuating mechanism that overcomes the normal urging of the valve into a sealed position to open the gap in response to a predetermined speed of rotation of the drive shaft by causing weighted levers to overcome the urging of the spring. Numerous improvements have been made by A. R. Wilfley & Sons, Inc. in this type of pump design and construction as exemplified by other U.S. Pat. Nos. 2,581,504; 3,137,237 to Zagar et al.; and 3,652,180 to Choquette et al. Among other problems associated with pump designs of the type described is that the weighted levers are normally exposed to the working fluid and any contaminants or foreign particles in the fluid. Moreover, liquid build-up in the pump casing behind the expeller region during intervals of starts and stops can result in leakage of that liquid away from the pump which is of particular concern when contaminants are present in the liquid.

In U.S. Pat. No. 4,915,579, granted to the assignee of this invention, the problem of leakage is overcome by substantially reducing the volume of liquid retained in the reservoir region and storing the liquid that does return to the reservoir without leakage each time that the pump is started or stopped. Further, the actuating mechanism of the valve assembly is isolated from the liquid in the reservoir and acts in a positive manner to open the valve assembly for the discharge of liquid by the expeller from the reservoir. However, it is desirable to further improve the opening and closing characteristics of the valve assembly in order to avoid leakage into the reservoir.

SUMMARY OF INVENTION

It is therefore an object of the present invention to provide for a novel and improved actuator mechanism for opening and closing the valve assembly in the seal housing of a pump.

It is another object of the present invention to provide in a sealing apparatus for centrifugal pumps of a type including a normally closed valve assembly for a valve actuating mechanism to control opening and closing within a narrow speed range; and further wherein spring members are so constructed and arranged as to undergo sufficient deflection at a substantially constant load as to accommodate tolerance variations within the pump.

A further object of the present invention is to provide in a constant speed centrifugal pump for a valve actuator mechanism which enables rapid opening and closing just below the operating speed of the pump so as to achieve higher intake head capability and minimize leakage into the containment reservoir or seal housing.

It is a still further object of the present invention to provide in a seal housing in a centrifugal pump for a novel and improved spring-loaded valve actuator mechanism, in which spring members are so constructed and arranged as to exhibit regressive characteristics to facilitate interaction with centrifugal force-responsive governor weights; and wherein the centrifugal force-responsive governor weights are so constructed and arranged as to achieve maximum efficiency in delivering an applied opening force to the spring members.

In accordance with the present invention, an actuator mechanism has been devised for a pump of the type including a drive shaft, pump casing and reservoir housing in spaced surrounding relation to the drive shaft with an impeller at one end of the drive shaft within the casing to discharge fluid introduced through a fluid inlet in the casing and through an outlet, and a fluid channel is provided to establish fluid communication between the pump casing and housing when the pump is in operation, the improvement comprising a valve assembly in the reservoir housing including a valve seat, a valve member and resilient means normally retaining the valve member in sealed engagement with the valve seat whereby to resist opening pressure until the drive shaft approaches the operating speed of the pump and centrifugal force-responsive means is movable under centrifugal force to impart sufficient opening pressure to the valve member to move it away from sealed engagement with the valve seat and establish fluid communication between the housing and the pump casing when the pump is in operation. Preferably the resilient means is defined by a plurality of washer-like spring elements arranged in back-to-back relation and are designed to undergo sufficient deflection to open the valve only when the centrifugal force-responsive means generates sufficient force in response to rotation of the drive shaft at a speed approaching the operating speed of the pump. Conversely, the spring elements will undergo rapid deflection in a direction returning the valve member to a closed position when the pump undergoes a very slight reduction in speed below the operating speed thereby greatly minimizing leakage into the reservoir housing.

The centrifugal force-responsive means takes the form of weighted pivot arms which will exert a progressively increasing opening pressure or force against the resilient means in response to an increase in the speed of rotation of the pump, the opening force increasing at an exponential rate.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIG. 2 is an enlarged sectional view in more detail of the seal housing portion of the pump shown in FIG. 1 and with the valve actuator mechanism shown in the open position;

FIG. 3 is an end view of the reservoir expeller of the pump shown in FIG. 2; and FIG. 4 is a sectional view enlarged of spring members in series relation forming a part of the valve actuator mechanism of the present invention.

DETAILED DESCRIPTION OF THE PREFERRED EMBODIMENT

Figure 1:
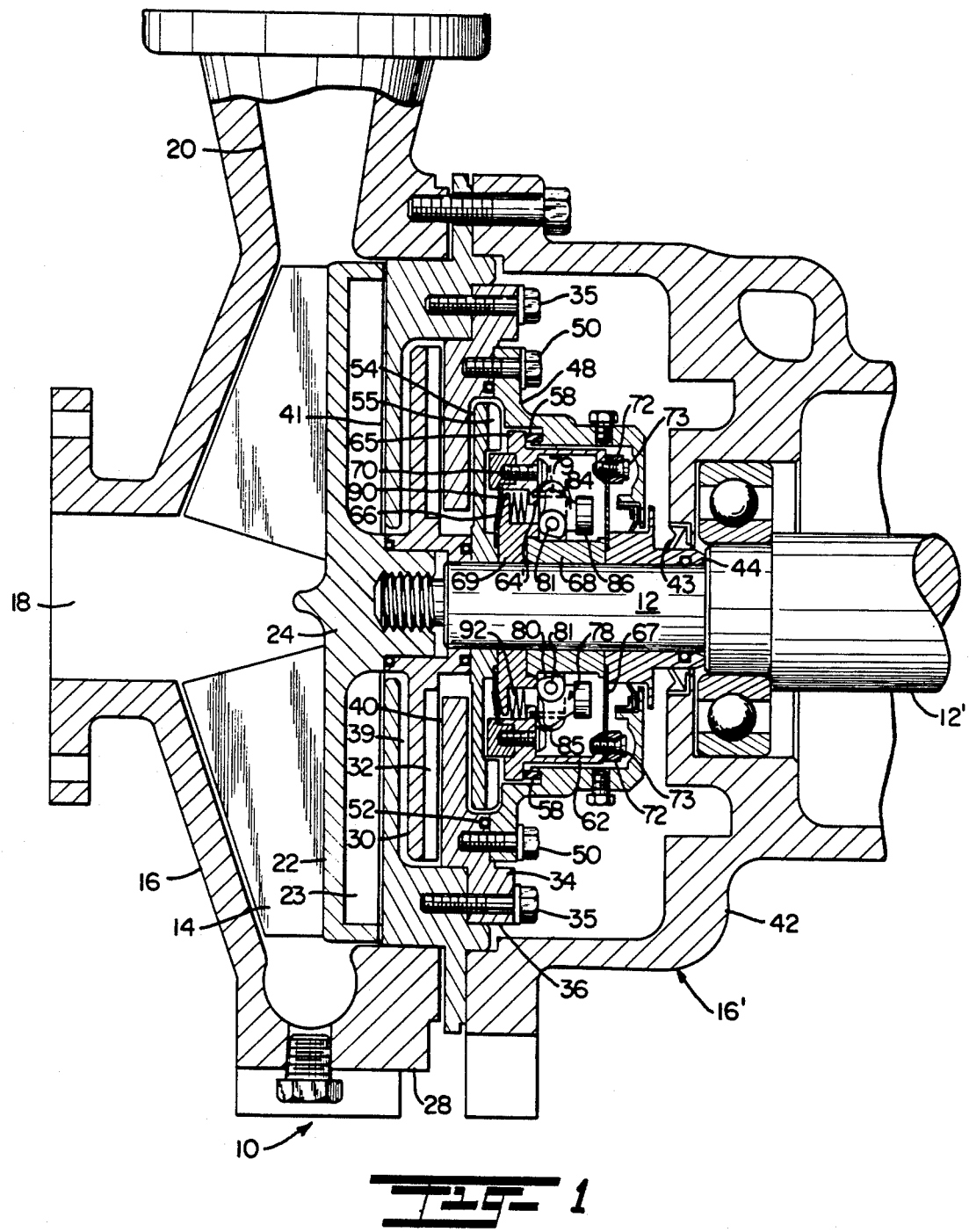
FIG. 1 is a sectional view of a centrifugal pump including a seal housing with a novel and improved actuator mechanism in accordance with the present invention, the valve actuator mechanism being shown in a closed position.

There is shown in FIG. 1 a centrifugal pump 10 including a drive shaft 12 and an impeller 14 mounted for rotation on the drive shaft 12 within an outer pump casing 16. The pump casing 16 has an inlet 18 at its forward end for introduction of a liquid or slurry and, under rotation of the impeller 14, the liquid is driven radially outwardly through the discharge or outlet 20 of the pump. Although not illustrated, the pump casing 16 is mounted on a suitable base and most desirably is mounted with the drive shaft disposed on a horizontal axis.

A primary expeller 22 is provided with vanes 23 on its rearward surface with the impeller vanes 14 on the forward or frontal surface of the expeller 22 so as to be carried for rotation with the expeller on a common hub 24 which is threaded onto the end of the shaft 12. Case plate 28 forms a unitary part of the pump casing 16 and is interposed between the expeller vanes 23 and a secondary expeller 30 which is rotatable with the shaft 12 and provided with rearwardly directed, radially extending vanes 32. The expeller 30 is interposed between the case plate 28 and a ring 34 which is attached to the case plate 28 by attaching bolts 35 extending through openings in spaced lugs 36 into threaded engagement with suitable bores in the case plate 28, and a gasket, not shown, is interposed between the confronting surfaces of the lugs 36 and case plate 28 to establish sealed engagement therebetween. As noted, the expeller 30 is axially spaced between the case plate 28 and the ring member 34 to establish circumferentially extending gaps 39 and 40. These gaps or spaces extend into communication with one another around the outer peripheral end of the expeller 30, and the gaps form a part of a continuous fluid channel which communicates with another circumferential interface 41 between the plate 28 and primary expeller vanes 23. In accordance with conventional practice, the pump casing 16 includes a rearward extension 16' and which terminates in an end wall 42 journaled to the enlarged end 12' of the shaft, and a primary seal 43 engages a sleeve 44 which is mounted on the shaft 12.

A seal or reservoir housing 19 is disposed within the casing extension 16' and is in the form of a generally cylindrical enclosure having a radial end wall 45 terminating in outer spaced surrounding relation to the sleeve 44 and including a lip seal 46 engaging the outer circumferential surface of the sleeve 44. The housing 19 terminates at one end opposite to the wall 45 in an outer circumferential skirt 48 which is secured to the ring 34 by cap screws 50 at spaced circumferential intervals around the skirt 48. An expeller ring 54 is disposed between the skirt 48 and ring 34 having radially extending, circumferentially spaced expeller vanes 55 in facing relation to the seal housing 19. A seal ring 58 is mounted for circumferential extension around a forward edge of the internal wall surface of the cylindrical portion of the reservoir housing 19 in confronting relation to the expeller member 54 so as to form a valve seat for a valve member 65.

A valve assembly actuator mechanism 60 is mounted on the shaft 12 between the expeller ring 54 and the sleeve 44 and comprises an outer cylindrical wall 62 and a wall portion 64 at one end of the wall 62 which terminates in an outer peripheral valve member or rim 65 which is engageable with the seal 58. Axially spaced, annular disks 66 and 67 are disposed at opposite ends of a governor sleeve 68, the latter being mounted for rotation with the shaft 12. The radial inner end of the disk 66 is fixed between the expeller ring 54 and a spring support sleeve 69; and the radial inner end of the disk 67 is fixed between the sleeves 44 and 68. The outer peripheral end of the disk 66 is held between an inboard lock ring 71 and inboard end of the wall 62 by circumferentially spaced bolts 70. The outer peripheral end of the disk 67 is affixed to the outboard end of the wall 62 by an outboard lock ring 72 and circumferentially spaced bolts 73 extending through the lock ring 72, disk 67 and outboard end of the wall 62. Appropriate lock washers are interposed between the heads of the bolts 70 and 73. The disks 66 and 67 may be suitably composed of a flexible non-metallic material so that the outer peripheral ends of the disks 66 and 67 are free to undergo unitized movement with the outer wall 62 of the actuator mechanism to cause movement of the valve rim 65 toward and away from the seal 58 in opening and closing the valve assembly.

The actuator mechanism 60 defines a sealed enclosure for weighted pivot members 78 which are pivotally mounted on the governor sleeve 68 in diametrically opposed relation to one another and are of the type disclosed in U.S. Pat. No. 4,915,579. Each pivot member 78 includes a radially directed support portion 80 fixed to the governor sleeve 68, a pivot shaft 81 and a pivotal leg member 84 which extends radially outwardly to terminate in a nose portion 85 as well as tapering in an outboard direction to terminate in a radially extending weight portion 86. When the shaft 12 undergoes rotation, the centrifugal force will be sufficient to cause the arcuate weighted portions 86 to swing radially and outwardly with respect to the pivots 81, as illustrated in FIG. 1, to the position illustrated in FIG. 2 and causing the outer nose ends 85 to advance in an axial direction inboard into engagement with an inner radial end 64' of the inboard end wall 64. The outboard end wall 45 of the reservoir housing 19 has an inner radial seal 46 in wiping engagement with the sleeve 44. Each of the weighted pivot members 78 includes a locator pin 79 extending between radially outward extension of the support bracket 80 and flange 64' to radially support or locate the outer wall 62 and disks 66, 67 with respect to the pivot members. Similarly, the stacking and arrangement of the spring members 92 with pairs in back-to-back or series relation to one another will control the resistance to the load or force imposed by the weighted arm members 78.

A spring support sleeve 69 includes a radially outwardly extending annular flange 90 which serves as an end stop for one end of a series of washer-like spring members 92, the opposite end of the spring member 92 bearing against the radially inwardly directed flange 64' of the end wall 64. As best seen from FIG. 4, the spring members 92 are customarily referred to as Belleville springs and are made up of washer-like spring elements 93 and 94, each having a central opening 95 and outer bent or inclined walls 96. These spring elements are arranged in pairs in face-to-face relation with one another with their outer peripheral edges engaging one another and each pair of spring members in contact with adjacent pairs at their center portion. In this relation, the generally washer-shaped spring members have been found to exert an increased resistance to the loading or centrifugal force imparted by the weight members 78 when the shaft 12 is initially rotated but as the shaft is accelerated up to a speed approaching the operating speed of the pump the springs will undergo rapid compression or deflection under the force of the weight members 78 bearing against the end wall 64 to force the outer valve seat 65 away from the seal 58.

As illustrated in FIG. 2, when the outer valve seat or rim 65 is moved away from the seal 58, any liquid contained within the housing 19 is free to advance past the valve seat 65 and is directed by the impeller vanes 55 through the cavity 40 surrounding the plate 34 and into the fluid channel or spacings 39, 40 and 41 between the secondary and primary expeller regions as described. The valve actuator mechanism 60 will remain open as long as the pump is rotated at a rate of speed causing the weighted pivot members 78 to bear against the end wall 64 and overcome the resistance of the spring members 92. When the pump is no longer operated and starts to approach a position at rest, the biasing of the spring members 92 will rapidly overcome the force of the pivot members 78 to return the valve 65 to its closed position as shown in FIG. 1. As this occurs, some liquid is free to leak past the outer valve member 65; and, any liquid which does leak back into the housing 19 can be retained and does not have to be drained out of the housing when the pump is not in operation. Any leakage which should possibly occur past the reservoir housing 19 and into the outer chamber within the case would be retained against leakage by the seal 46.

In the assembly of the present invention and particularly referring to the preferred form as described, the axial travel or movement of the valve assembly and specifically the disks 66 and 67 in advancing between an open and closed position may be very slight, for example, on the order of 0.080" to 0.090". For the purpose of illustration and not limitation, when the disks are assembled onto the shaft 12, the dimensioning is such that the springs 92 are preloaded by the tightening of the impeller hub 24 on the shaft 12 with the valve rim 65 bearing against the seal 58 and causing the disks 66 and 67 to be bent slightly as shown. Initially, when the pump is started, the spring members 92 will undergo no deflection in response to the centrifugal force causing the pivot members 78 to move axially against the flange 64'. However, the regressive characteristics of the washer-like spring members 92 will permit them to undergo substantial deflection as the pump approaches its operating speed; or, in other words, the spring members will undergo a large degree of deflection for a relatively small change in force at a speed just below the operating speed of the pump so that the valve member 65 will not begin to move away from the seal 58 until the pump is substantially up to operating speed. The centrifugal pump utilized in the preferred form of invention is a constant speed pump and intended to maintain a substantially constant operating speed and is not subject to adjustment in operating speed. When the pump is stopped and, as the pump speed begins to reduce below its operating speed, the spring members 92 will rapidly expand so as to cause almost instantaneous closure just below the operating speed of the pump thereby avoiding leakage of fluid back into the reservoir housing. In this relation, as the valve member 65 moves away from the seal ring 58, the lock ring 71 in advancing toward the expeller 54 will act as a limit stop to limit the travel of the valve member 65. The speed range within which deflection of the spring members is sufficient to open the valve can be closely controlled not only by regulating the spring force of the members 92 but the weighting and center of gravity of the weighted arm members 78. As noted earlier, the weighted lever arms 78 will increase the opening pressure or force at an exponential rate in relation to the increase in speed of rotation of the pump, and it is desirable that the center of gravity of the weighted arm member 78 be located radially outwardly of the pivot 81 for most effective operation of the valve assembly 60.

It is therefore to be understood that various modifications and changes may be made in the construction and arrangement of parts as well as their specific intended applications without departing from, the spirit and scope of the present invention as defined by the appended claims.

I claim:

1. In pumping apparatus wherein a centrifugal pump having a predetermined operating speed includes a drive shaft, a pump casing and a reservoir housing in spaced surrounding relation to said drive shaft, an impeller at one end of said drive shaft within said casing to discharge fluid introduced via a fluid inlet in said casing through an outlet, and a fluid channel is provided to establish fluid communication between said pump casing and said housing when said pump is in operation, the improvement comprising:

a valve assembly associated with said reservoir housing including a valve seat, a valve member and resilient means normally retaining said valve member in sealed engagement with said valve seat whereby to resist opening pressure and prevent fluid communication between said housing and said pump casing until said drive shaft is substantially at the operating speed of said pump; and centrifugal force-responsive means driven by said drive shaft and being movable under centrifugal force generated by rotation of said drive shaft to impart sufficient opening pressure to said valve member to overcome said resilient means and move said valve member away from sealed engagement with said valve seat whereby to establish fluid communication between said housing and said pump casing when said pump is in operation and said drive shaft is substantially at the operating speed of said pump.

2. In pumping apparatus according to claim 1, a reservoir housing defined by axially spaced, radially extending disks and an outer circumferentially extending wall between said disks, said resilient means having spring members adjacent to one of said disks to yieldingly resist the opening pressure of said centrifugal force-responsive means.

3. In pumping apparatus according to claim 2, said spring members being in the form of washer-like spring elements arranged in pairs, said elements of a pair disposed in face-to-face relation to one another.

4. In pumping apparatus according to claim 3, means connecting said one disk to said seal ring, and inner peripheral edges of said disks mounted for rotation with said drive shaft.

5. In pumping apparatus according to claim 4, said housing including a sleeve mounted on said drive shaft, said inner edges of said disks engaging opposite ends of said sleeve, said centrifugal force-responsive means including pivot arms pivotally mounted in circumferentially spaced relation on said sleeve within said housing, one end of said arm including a radially extending weight member and an opposite end of said arm engageable with said seal ring on a side opposite to the attachment of said one disk to said seal ring.

6. In pump sealing apparatus for a constant operating speed centrifugal pump wherein said pump includes a drive shaft, a pump casing and a reservoir housing in spaced surrounding relation to said drive shaft, an impeller at one end of said drive shaft within said casing to discharge fluid introduced via a fluid inlet in said casing through an outlet, and a fluid channel is provided to establish fluid communication between said pump casing and said housing when said pump is in operation, the improvement comprising:

said reservoir housing including a valve seat, a valve member and resilient biasing means in the form of Belleville spring washer elements normally retaining said valve member in sealed engagement with said valve seat whereby to resist opening pressure and prevent fluid communication between said housing and said pump casing until said drive shaft is substantially at the operating speed of said pump; and centrifugal force-responsive pivot means driven by said drive shaft and including a weighted lever arm movable under centrifugal force generated by rotation of said drive shaft to overcome said resilient means and impart sufficient opening pressure to said valve member to move said valve member away from sealed engagement with said valve seat whereby to establish fluid communication between said housing and said pump casing when said pump is in operation and said drive shaft is substantially at the operating speed of said pump.

7. In pump sealing apparatus according to claim 6, said valve assembly defining a sealed enclosure including axially spaced, radially extending disks mounted for rotation on said drive shaft and an outer circumferentially extending wall between said disks, said resilient biasing means having spring members in the form of washer-like spring elements arranged in pairs, said elements of a pair disposed in face-to-face relation to one another in the path of movement of said lever arm.

8. In pump sealing apparatus according claim 6, said housing including a sleeve mounted on said drive shaft, said inner edges of said disks engaging opposite ends of said sleeve, said pivot means including diametrically opposed lever arms pivotally mounted on said sleeve within said housing, one end of each lever arm including a radially extending weight member and an opposite end of said arm engageable with said valve member on a side opposite to the attachment of said one disk to said valve member.

9. In pump sealing apparatus according to claim 6, said Belleville spring washer elements arranged in pairs, each spring element of a pair disposed in face-to-face relation to one another and each pair of spring elements disposed in back-to-back relation to an adjacent pair of spring elements.

10. In pump sealing apparatus according to claim, 9, including end stop members on opposite ends of said spring elements, one of said end stop members being in the path of movement of said lever arm.

* * * * *